(12) United States Patent
Bien

(10) Patent No.: US 10,484,049 B2
(45) Date of Patent: Nov. 19, 2019

(54) COMMUNICATION SYSTEM

(71) Applicant: UNIST (Ulsan National Institute of Science and Technology), Ulsan (KR)

(72) Inventor: Franklin Don Bien, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 15/760,911

(22) PCT Filed: Sep. 19, 2016

(86) PCT No.: PCT/KR2016/010406
§ 371 (c)(1),
(2) Date: Mar. 16, 2018

(87) PCT Pub. No.: WO2017/048090
PCT Pub. Date: Mar. 23, 2017

(65) Prior Publication Data
US 2018/0205415 A1    Jul. 19, 2018

(30) Foreign Application Priority Data

Sep. 17, 2015 (KR) .................. 10-2015-0131519

(51) Int. Cl.
*H04B 5/00* (2006.01)
*H04B 5/02* (2006.01)
(Continued)

(52) U.S. Cl.
CPC ............ *H04B 5/0031* (2013.01); *H04B 5/02* (2013.01); *H04B 14/00* (2013.01); *H04L 29/06* (2013.01); *B63B 9/00* (2013.01)

(58) Field of Classification Search
None
See application file for complete search history.

(56) References Cited

U.S. PATENT DOCUMENTS 6,686,882 B2 * 2/2004 Petros ................. H01Q 1/1285
343/700 MS
6,963,305 B2 * 11/2005 Knapp ................ H01Q 1/1285
342/367

(Continued)

FOREIGN PATENT DOCUMENTS

EP        2541564 A1    1/2013
GB        2455628 A     6/2009

(Continued)

OTHER PUBLICATIONS

International Search Report and Written Opinion Application No. PCT/KR2016/010406 reported on Nov. 30, 2016.

(Continued)

*Primary Examiner* — Tuan A Tran
(74) *Attorney, Agent, or Firm* — Miller, Matthias & Hull LLP

(57) ABSTRACT

A ship network communication system according to an embodiment of the present invention that enables data transmission and reception wirelessly in a ship regardless of the thickness of a bulkhead comprises: a first communication device, attached to a first bulkhead from among a plurality of bulkheads dividing a hull into a plurality of spaces, to receive transmission data transmitted from a transmitting terminal; and a second communication device, attached to a second bulkhead from among the bulkheads, to receive the transmission data from a first Ethernet communication module through near field communication and to transfer the received transmission data to a receiving terminal, wherein the first communication device and the second communication device perform near field communication using the first bulkhead and the second bulkhead as a communication medium.

11 Claims, 7 Drawing Sheets

(51) Int. Cl.
*H04B 14/00* (2006.01)
*H04L 29/06* (2006.01)
*B63B 9/00* (2006.01)

(56) References Cited

U.S. PATENT DOCUMENTS

| | | | | |
|---|---|---|---|---|
| 7,890,053 | B2* | 2/2011 | Washiro | H04B 5/0012 |
| | | | | 343/745 |
| 7,893,564 | B2* | 2/2011 | Bennett | H02J 17/00 |
| | | | | 307/104 |
| 8,014,678 | B2* | 9/2011 | Echols, Jr. | H04B 10/801 |
| | | | | 398/115 |
| 8,233,842 | B2* | 7/2012 | Symons | G06K 19/0723 |
| | | | | 455/41.1 |
| 8,502,464 | B2* | 8/2013 | Lakirovich | H05B 33/086 |
| | | | | 315/254 |
| 9,054,745 | B2* | 6/2015 | Moon | H04B 5/0012 |
| 9,450,651 | B2* | 9/2016 | Subramoniam | H04B 5/0031 |
| 9,700,730 | B2* | 7/2017 | Carbunaru | A61N 1/3787 |
| 2003/0119568 | A1* | 6/2003 | Menard | H04W 52/0229 |
| | | | | 455/572 |
| 2007/0064471 | A1 | 3/2007 | Daily | |
| 2008/0070499 | A1 | 3/2008 | Wilhelm | |
| 2009/0156119 | A1 | 6/2009 | Rhodes et al. | |
| 2011/0287712 | A1 | 11/2011 | Conway et al. | |
| 2014/0339914 | A1 | 11/2014 | Pooley | |

FOREIGN PATENT DOCUMENTS

| | | |
|---|---|---|
| KR | 10-2011-0031098 A | 3/2011 |
| KR | 10-2011-0078206 A | 7/2011 |
| KR | 10-2012-0134507 A | 12/2012 |
| WO | WO 2008102814 A1 | 8/2008 |

OTHER PUBLICATIONS

Cha, Jongwan, "Magnetic Field Communication—Wireless Power Transmission", KOIT Information Communication Newspaper, Dec. 21, 2012, http://www.koit.co.kr/news/articleView.html?idxno=45556, pp. 1-2.

* cited by examiner

COMMUNICATION SYSTEM

CROSS-REFRENCE TO RELATED APPLICATIONS

This application is a 35 U.S.C § 371 U.S national stage filing of International Patent Application No. PCT/KR2016/010406 filed on Sep. 19, 2016.

TECHNICAL FIELD

At least one example embodiment relates to a communication device, and more particularly, to a ship network communication system.

RELATED ART

To maintain the competiveness of the shipbuilding business as the national key industry, it is very important to enhance the efficiency of shipbuilding, such as building a ship during a short period of time with relatively small cost.

In a ship under construction, assembly order of each part is determined based on a construction stage of the ship. A progress situation and an accident situation occurring on one side need to be shared with others in real time. Accordingly, communication is significantly important in the ship under construction.

For example, if a design of a ship under construction is modified, the modified design needs to be immediately received at a site in which the modified design is to be applied. Also, other sites may need to change ship construction order by applying the modified design. Alternatively, designs or construction of other parts need to be modified.

However, since an inside of the ship is divided into a plurality of spaces through thick bulkheads, an existing wireless communication technology using radio waves may not be applied in a poor wireless communication environment in which radio waves are severely shielded. Also, due to issues, such as cost, time, and continuous change in an internal environment by a shipbuilding operation, it may be difficult to install wired communication facility during the shipbuilding operation.

To outperform such issues, a communication system using ultrasonic waves is disclosed in Korean Patent Laid-Open Publication No. 10-2011-0031098 (hereinafter, referred to as Prior Document 1).

However, ultrasonic waves may not pass through a metal wall with a maximum thickness of 57 mm and thus, may not be transmitted through a ship bulkhead with a thickness of 57 mm or more. Thus, if a thickness of a bulkhead increases, a communication system according to the related art including Prior Document 1 may not be applied.

SUMMARY

According to an aspect, the present disclosure may include the following configuration. There is provided a signal transmission and reception apparatus that performs communication by inducing an electromagnetic field in a conductive object and by using the object as a medium, the apparatus including an external communication module configured to exchange data with an external communication terminal using at least one first communication scheme of a wired communication and a wireless communication; and a magnetic field communication module configured to induce the electromagnetic field within the object and to carry the data in the induced electromagnetic field as a signal and thereby transmit the data.

According to an example embodiment, the magnetic field communication module may include a plurality of coils associated with a magnetic resonance scheme. Also, the plurality of coils may include nine coils that are provided in a 3-by-3 matrix form.

According to another example embodiment, the conductive object may include a metal bulkhead, and the magnetic field communication module may be supplied with power and may induce the electromagnetic field in an inside of the metal bulkhead and a counterpart device, and may carry, in the electromagnetic field, the data that is provided in an electrical signal form from the external communication module and thereby transmit the data. Also, the conductive object may include a plurality of metal bulkheads that is physically separate from each other and in contact with each other. Also, the magnetic field communication module may be supplied with the power and may induce the electromagnetic field in the plurality of metal bulkheads and the counterpart device, and may carry the data in the electromagnetic field and thereby transmit the data.

According to another example embodiment, the external communication module may include an Ethernet communication module. Also, the Ethernet communication module may convert the data to an electrical signal form using one of a frequency shift keying (FSK) modulation scheme and a phase shift keying (PSK) modulation scheme, and may provide the data to the magnetic field communication module.

According to another example embodiment, the magnetic field communication module may modulate the data provided from the external communication module through a phase modulation (PM) scheme and may carry the data in the induced electromagnetic field and thereby transmit the data.

According to another example embodiment, in response to receiving a signal transmitted from a counterpart terminal from the conductive object, the magnetic field communication module may modulate the data through a PM scheme and may transmit the data to the external communication module.

According to another example embodiment, the magnetic field communication module may have a resonant frequency capable of being adjusted to be different based on a material and a thickness of the object.

According to another example embodiment, when the signal transmission and reception apparatus communicates with a counterpart device, the magnetic field communication module may not be provided at a location at which the signal transmission and reception apparatus faces the counterpart device based on the conductive object.

According to another aspect, the present disclosure may include the following configuration. There is provided a ship network communication system including a first communication device provided to a first bulkhead among a plurality of bulkheads that divides a hull into a plurality of spaces and configured to receive transmission data transmitted from a transmitting terminal; and a second communication device provided to a second bulkhead among the bulkheads and configured to receive the transmission data from the first Ethernet communication module and to transfer the received transmission data to a receiving terminal. The first communication device and the second communication device perform near field communication using the first bulkhead and the second bulkhead as a communication medium.

The first communication device may include a first Ethernet communication module configured to receive Ethernet-based transmission data from the transmitting terminal through a transmission control protocol/Internet protocol (TCP/IP), and to convert the Ethernet-based transmission data to analog-typed transmission data through a frequency shift keying (FSK) modulation scheme or a phase shift keying (PSK) modulation scheme; and a first magnetic field communication module configured to receive the analog-typed transmission data from the first Ethernet communication module and to modulate the received analog-typed transmission data through a phase modulation (PM) scheme. The second communication device may include a second magnetic field communication module configured to receive phase-modulated transmission data from the first magnetic field communication module through the first and second bulkheads, to convert the transmission data to digital-typed transmission data, and to modulate the digital-typed transmission data through a pulse code modulation (PCM) scheme; and a second Ethernet communication module configured to receive the pulse code modulated transmission data from the second magnetic field communication module, to convert the received transmission data to Ethernet-based transmission data, and to transmit the converted Ethernet-based transmission data to a receiving terminal through a TCP/IP.

The network communication system may further include a first access point (AP) configured to connect the transmitting terminal to the first Ethernet communication module over a wired network or a wireless network; and a second AP configured to connect the receiving terminal to the second Ethernet communication module over the wired network or the wireless network.

When the first and second bulkheads are the same bulkhead, the first communication device may be provided on a first surface of the first bulkhead and the second communication device may be provided on a second surface of the first bulkhead.

The first communication device may include a first battery configured to supply power to the first communication device and the second communication device may include a second battery configured to supply power to the second communication device. The first battery and the second battery may be connected to an external power source and charged with power that is supplied from the external power source.

When the first bulkhead and the second bulkhead are connected through at least one third bulkhead, the first communication device and the second communication device may perform near field communication using the first bulkhead, the second bulkhead, and the third bulkhead as a communication medium.

DETAILED DESCRIPTION OF THE PRESENTLY PREFERED EMBODIMENTS

Figure 1:
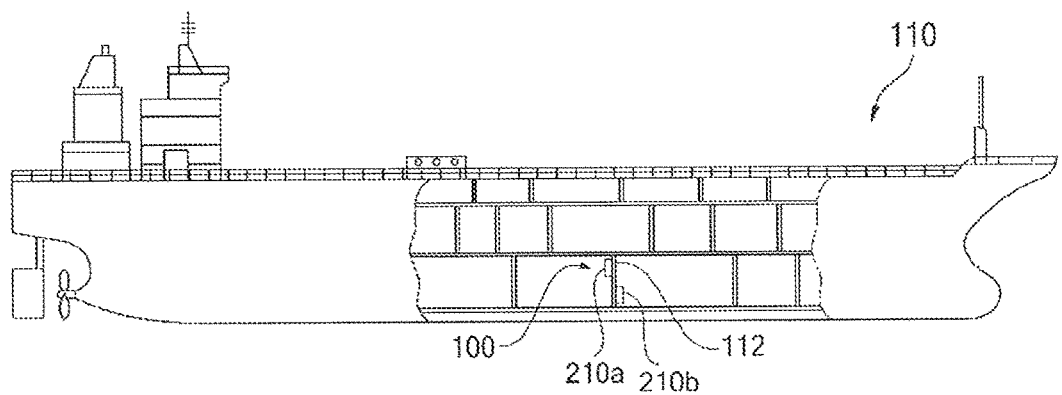
FIG. 1 illustrates a configuration of a ship to which a ship network communication system according to an example embodiment is applied.

When assigning reference numerals to components illustrated in the respective drawings, like reference numerals refer to like components throughout although they are illustrated in different drawings.

Meanwhile, the terminology disclosed herein needs to be understood as follows.

The singular forms "a", "an", and "the" are intended to include the plural forms as well, unless the context clearly indicates otherwise. Terms, such as "first", "second", etc., are used to distinguish one component from another component and thus, the scope of the disclosure is not to be limited by the terms.

It will be understood that the terms "comprises/includes" and "has" do not preclude the presence or addition of one or more other features, numbers, operations, components, parts, or combinations thereof.

The term "at least one" needs to be understood to include any combination possible from one or more related items. For example, "at least one of a first item, a second item, and a third item" indicates each of the first item, the second item, or the third item, and also indicates any combinations of items possible from two or more of the first item, the second item, and the third item.

Hereinafter, a level measurement device according to an example embodiment will be described with reference to the accompanying drawings.

FIG. 1 illustrates a configuration of a ship to which a ship network communication system according to an example embodiment is applied.

Referring to FIG. 1, a ship network communication system 100 according to an example embodiment is used for a ship 110. In general, the ship 110 is divided into a plurality of compartments through a plurality of bulkheads 112, and communication devices 210a and 210b that constitute the ship network communication system 100 are provided based on the bulkhead 112. For example, each of the communication devices 210a and 210b may be provided in a compartment. According to an example embodiment, the communication devices 210a and 210b may be provided to the bulkhead 112.

Although FIG. 1 illustrates only two communication devices 210a and 210b, communication devices 210 may be provided to each of the plurality of bulkheads 112 to perform smooth communication within the ship 110.

Referring to FIG. 1, the communication devices 210a and 210b include the first communication device 210a provided on a first surface of the bulkhead 112 and the second communication device 210b provided on a second surface of the bulkhead 112. Here, the second surface refers to a surface that faces the first surface on the bulkhead 112.

Hereinafter, the overall configuration and functions of the first communication device 210a and the second communication device 210b will be described with reference to FIGS. 2 through 4 based on the assumption that the ship network communication system 100 includes the first communication device 210a and the second communication device 210b for clarity of description.

Figure 2:
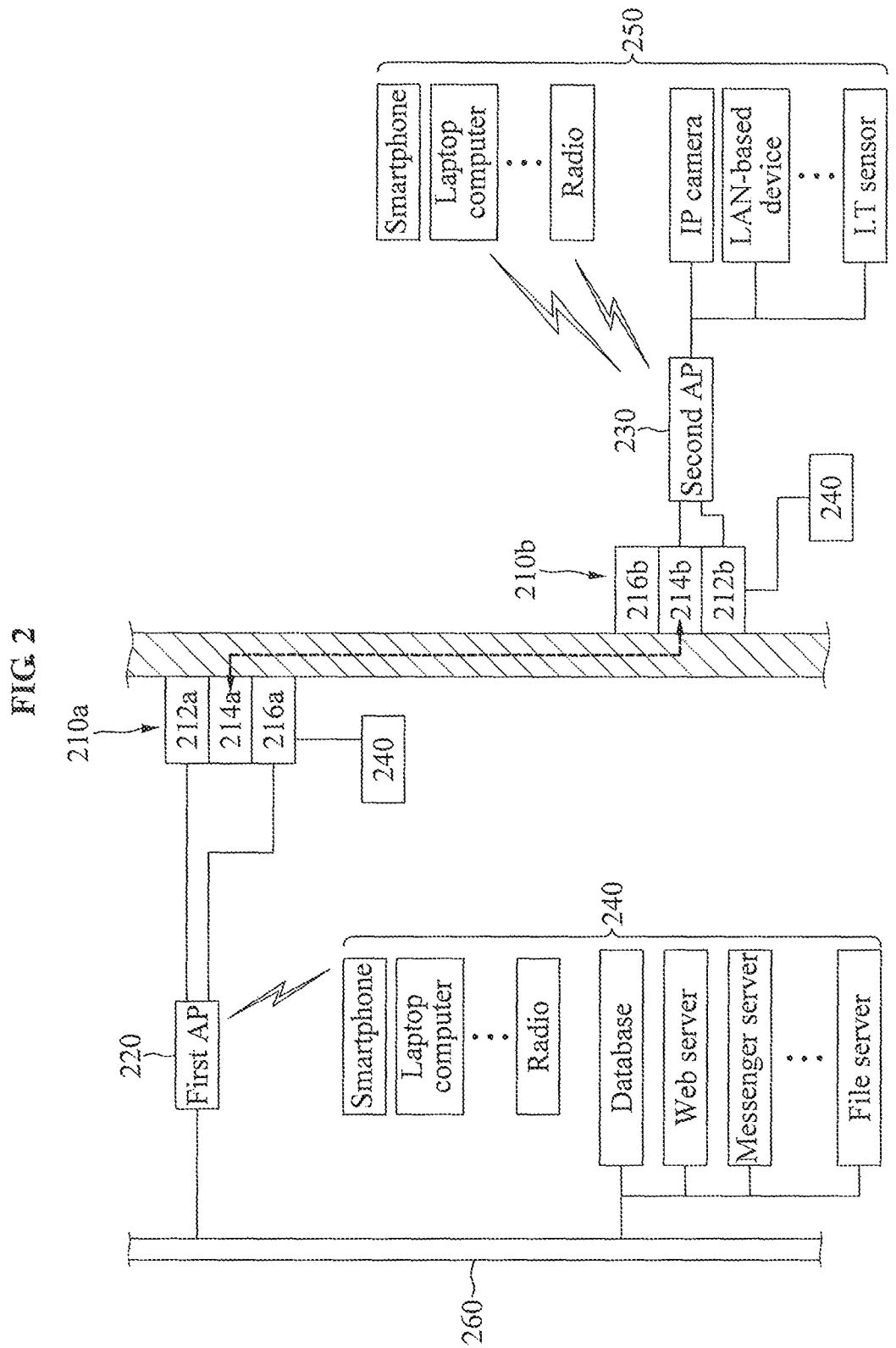
FIG. 2 is a diagram illustrating a configuration of a ship network communication system according to an example embodiment.

FIG. 2 illustrates a configuration of a ship network communication system according to an example embodiment.

Referring to FIG. 2, the ship network communication system 100 according to an example embodiment includes the first communication device 210a and the second communication device 210b that are provided to the bulkhead 112. Also, the ship network communication system 100 may further include a first access point (AP) 220 and a second AP 230. In the following description, it is assumed that the ship network communication system 100 includes the first AP 220 and the second AP 230.

The first communication device 210a is provided on the first surface of the bulkhead 112 to receive transmission data from a transmitting terminal 240 and to transfer the received transmission data to the second communication device 210b through near field communication using the bulkhead 112 as a communication medium.

The second communication device 210b is provided on the first surface of the bulkhead 112 to receive the transmission data transferred from the first communication device 210a using the bulkhead 112 as a communication medium and to transmit the received transmission data to a receiving terminal 250.

Referring to FIG. 2, the first communication device 210a includes a first Ethernet communication module 212a, a first magnetic field communication module 214a, and a first battery 216a, the second communication device 210b includes a second Ethernet communication module 212b, a second magnetic field communication module 214b, and a second battery 216b.

The first Ethernet communication module 212a receives, from the transmitting terminal 240, transmission data to be transmitted to the receiving terminal 260. In detail, the first Ethernet communication module 212a receives Ethernet-based transmission data from the transmitting terminal 240 according to a transmission control protocol/Internet protocol (TCP/IP) through a TCP/IP socket module (not shown) included in the first Ethernet communication module 212a.

According to an example embodiment, the transmitting terminal 240 may be a device capable of transmitting data in a wired manner, such as a database, a web server, a messenger server, a file server, and the like, interacting with an internal network 260, for example, an in-company network, or may be a device capable of transmitting data in a wireless manner, such as a smartphone, a laptop computer, a radio, and the like.

Data transmitted from the transmitting terminal 240 may include character string data, voice data, and image data.

According to the example embodiment, the first Ethernet communication module 212a may connect to the internal network 260 through the first AP 220 and may receive transmission data from the transmitting terminal 240 capable of transmitting data in a wired manner. Also, the first Ethernet communication module 212a may connect to a wireless network through the first AP 230 and may receive transmission data from the transmitting terminal 240 capable of transmitting data in a wireless manner.

Although the example embodiment describes that the first Ethernet communication module 212a connects to the internal network 260 through the first AP 220, it is provided as an example only. According to a modified example embodiment, the first Ethernet communication module 212a may directly connect to the internal network 260.

Once Ethernet-based transmission data is received from the transmitting terminal 240 through a TCP/IP, the first Ethernet communication module 212a may modulate the received transmission data through a frequency shift keying (FSK) modulation scheme or a phase shift keying (PSK) modulation scheme.

The FSK scheme refers to a frequency modulation system for transmitting digital data through a change in discrete frequencies of a carrier wave. The simplest FSK modulation scheme is a binary FSK (BFSL) modulation scheme. In the binary FSK modulation scheme, "1" is referred to as a mark frequency and "0" is referred to as a space frequency.

The PSK modulation scheme refers to a digital modulation scheme for modifying or modulating a phase of a reference signal, for example, a carrier wave, and transmitting data. All of the digital modulation schemes use a predetermined number of distinguishable signals to represent digital data. The PSK modulation scheme uses a predetermined number of phases to which a unique binary number pattern is allocated, and each phase refers to a value acquired by encoding the same number of bits. Each bit pattern forms a symbol that is represented as a specific phase. Accordingly, a side that demodulates modulated data restores original data by discovering a phase of a received signal, and by mapping the discovered phase to a symbol represented using the phase.

Once an FSK modulation or a PSK modulation is completed, the first Ethernet communication module 212a converts FSK modulated or PSK modulated transmission data to analog-typed transmission data using a digital-to-analog convertor, and transfers the analog-typed transmission data to the first magnetic field communication module 214a.

The first magnetic field communication module 214a receives the analog-typed transmission data from the first Ethernet communication module 212a and modulates the received analog-typed transmission data through a PM scheme. The PM scheme refers to a modulation scheme for changing a phase of a carrier wave with respect to an amplitude of an input signal. The PM scheme exhibits a stable output and is suitable for high-density recording since an angle of a sine carrier wave changes based on a polarity and thus, the sine carrier wave has only two types at all times.

Once a phase modulation is completed, the first magnetic field communication module 214a transfers the phase-modulated transmission data to the second magnetic field communication module 214b through near field communication using the bulkhead 112 as a communication medium.

Figure 3A:
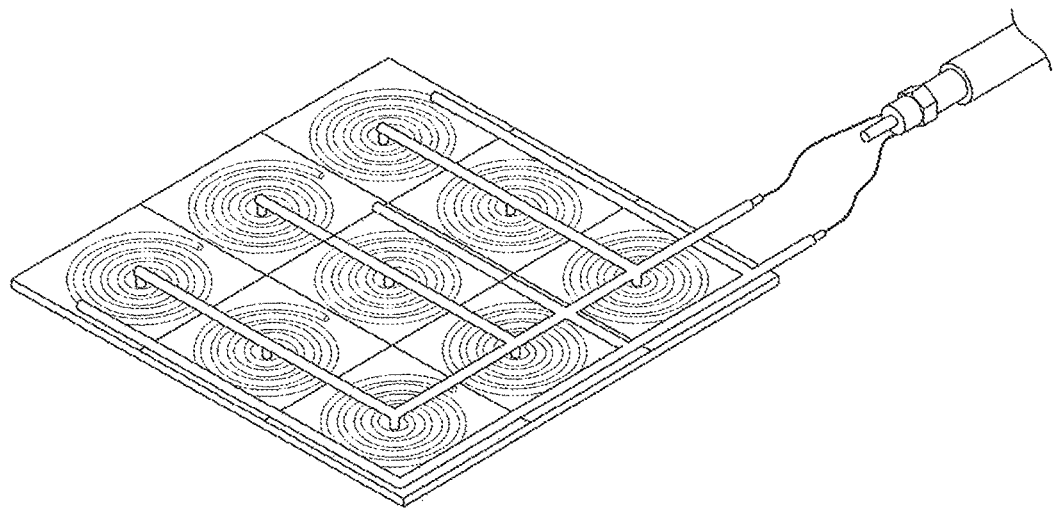
FIGS. 3A and 3B illustrate examples of a magnetic field communication module of FIG. 2.

According to an example embodiment, referring to FIG. 3A, the first magnetic field communication module 214a may be configured using 9 coils that resonate as a magnetic resonant type to pass through the bulkhead 112 and to transfer data. Here, the coils may be provided in a 3-by-3 matrix form of FIG. 3A.

The first battery 216a is provided to supply power to at least one of the first communication device 210a and the first AP 220, and referring to FIG. 2, connects to an external power source 270 and is supplied with the power from the external power source 270 and charged with the supplied power.

The second magnetic field communication module 214b receives transmission data modulated by the first magnetic field communication module 214a through near field communication using the bulkhead 112 as a communication medium. The second magnetic field communication module 214b converts analog-typed transmission data to a digital type through an analog-to-digital convertor included in the second magnetic field communication module 214b. Once conversion of the transmission data to the digital type is completed, the second magnetic field communication module 214b modulates the digital-typed transmission data through a pulse code modulation (PCM) scheme and transfers the modulated digital-typed transmission data to the first Ethernet communication module 212b.

Figure 3B:
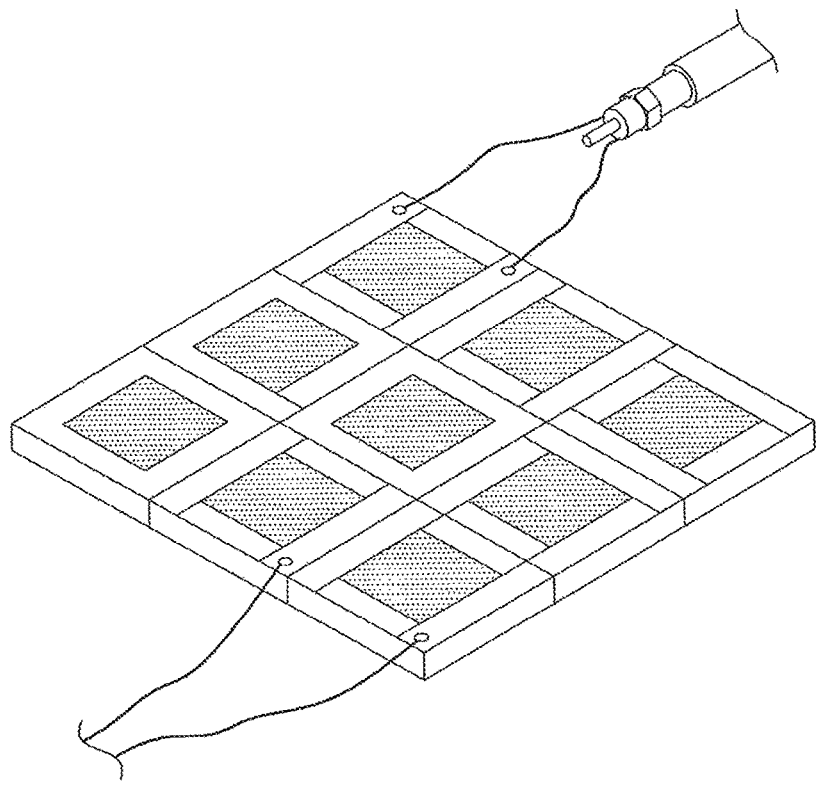

According to an example embodiment, referring to FIG. 3B, the second magnetic field communication module 214b may be configured using 9 coils that resonate as a magnetic resonant type to perform near field communication with the first magnetic field communication module 214a. Here, the coils may be provided in a 3-by-3 matrix form of FIG. 3B, resonant frequencies of the first magnetic field communication module 214a and the second magnetic field communication module 214b may be adjusted based on a material and a thickness of the bulkhead 112.

As described above, according to example embodiments, the first magnetic field communication module 214a and the second magnetic field communication module 214b may transmit and receive transmission data through near field communication using the bulkhead 112 as a communication medium and thus, may be set at any locations of the bulkhead 112. That is, there is no need to provide the first magnetic field communication module 214a and the second magnetic field communication module 214b at mutually corresponding locations for the magnetic field communication.

The second Ethernet communication module 212b receives the transmission data pulse-code-modulated by the second magnetic field communication module 214b, converts the received transmission data to Ethernet-based transmission data according to a TCP/IP, and transmits the converted Ethernet-based transmission data to the receiving terminal 250 through the second AP 230.

Meanwhile, the receiving terminal 250 that receives the transmission data from the second Ethernet communication module 212b may be a device having a function capable of receiving data in a wireless manner, such as a smartphone, a laptop computer, a radio, and the like, or may be a device having a function capable of receiving data in a wired manner, such as an IP camera, an Internet of things (IoT) sensor, a local area network (LAN)-based device, and the like.

According to the example embodiment, when the receiving terminal 250 is a device having a function capable of receiving data in a wireless manner, the receiving terminal 250 may connect to the second AP 230 over a wireless network and may receive transmission data. When the receiving terminal 250 is a device having a function capable of receiving data in a wired manner, the receiving terminal 250 may directly connect to the second AP 230 and may receive transmission data.

The second battery 216b is provided to supply power to at least one of the second communication device 210b and the second AP 230, and may be supplied with power from a separate external power source 280 and may be charged with the supplied power.

Although FIG. 2 is described that the first AP 220 is supplied with the power from the first battery 216a and the second AP 230 is supplied with the power from the second battery 216b, it is provided as an example only. According to a modified example embodiment, the first AP 220 may be directly supplied with the power from the external power source 270 and the second AP 230 may be directly supplied with the power from the external power source 280.

Although the example embodiment describes that the first communication device 210a receives transmission data from the transmitting terminal 240 and the second communication device 210b transmits the transmission data transferred from the first communication device 210a to the receiving terminal 250, it is provided as an example only.

According to a modified example embodiment, the second communication device 210b may receive transmission data from the receiving terminal 250 and the first communication device 210a may transmit the transmission data transferred from the second communication device 210b to the transmitting terminal 240. According to the example embodiment, the aforementioned function of the first Ethernet communication module 212a and function of the second Ethernet communication module 212b may be switched and the function of the first magnetic field communication module 214a and the function of the second magnetic field communication module 214b may be switched.

According to example embodiments, there may be provided a ship network communication system that enables data to be transmitted and received in a wired or wireless manner within a ship regardless of a thickness of a bulkhead. Also, there may be provided a ship network communication system that may transmit data through near field communication using a bulkhead as a communication medium. Also, there may be provided a ship network communication system that may readily determine an installation location on a bulkhead.

Modified Example Embodiment

In FIG. 2, the first Ethernet communication module 212a and the first magnetic field communication module 214a are integrally configured within the first communication device 210a, and the second Ethernet communication module 212b and the second magnetic field communication module 214b are integrally configured within the second communication device 210b.

Figure 4A:
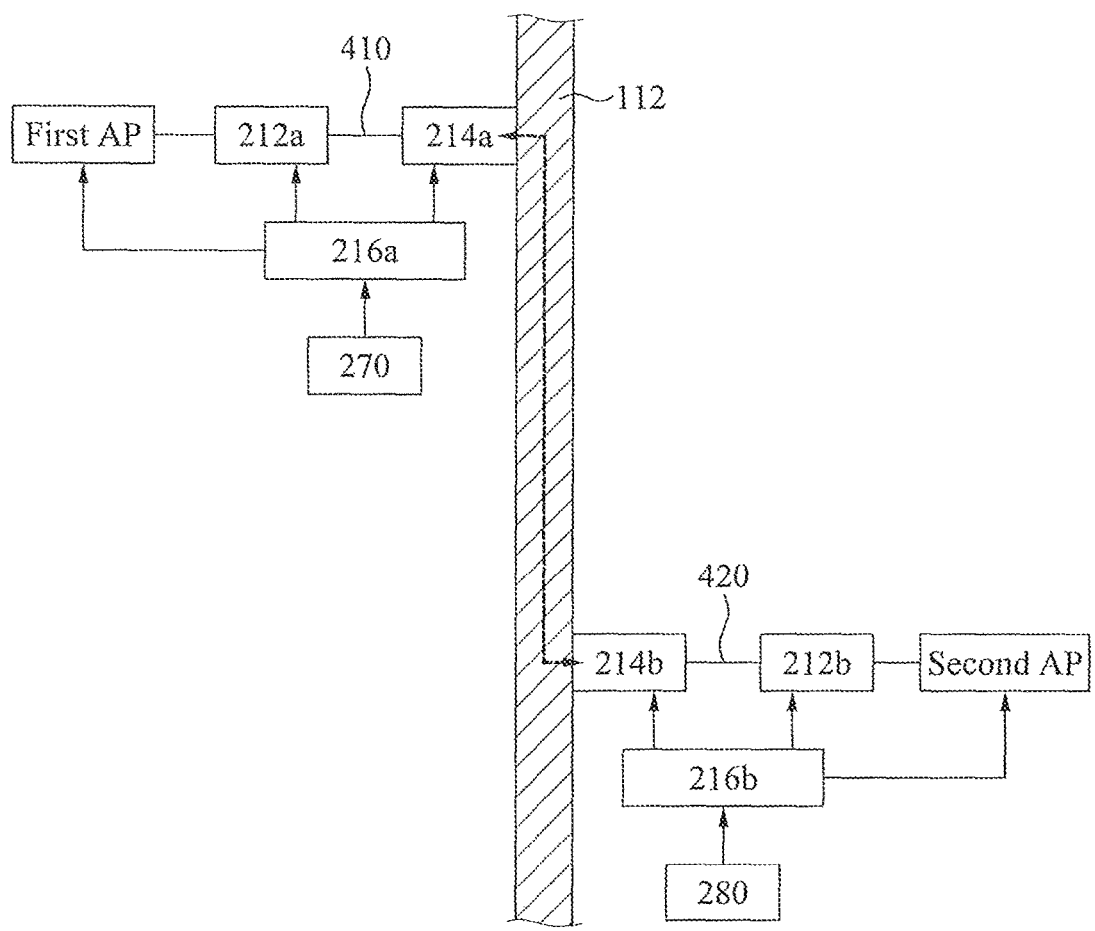
FIGS. 4A through 4E illustrate a configuration of a ship network communication system according to various example embodiments.

According to the modified example embodiment, referring to FIG. 4A, the first Ethernet communication module 212a and the first magnetic field communication module 214a may be physically separate from each other and connected to each other through a first cable 410, and the second Ethernet communication module 212b and the second magnetic field communication module 214b may be physically separate from each other and connected to each other through a second cable 420.

According to the example embodiment, the first magnetic field communication module 214a may be provided on the first surface of the bulkhead 112 and the second magnetic field communication module 214b may be provided on the second surface of the bulkhead 112.

In addition, although FIG. 2 is described that the first communication device 210a and the second communication device 210b are provided based on a single bulkhead 112 to transmit and receive data, the first communication device 210a and the second communication device 210b may perform near field communication using the bulkhead as a communication medium and thus, may transmit and receive data using a plurality of bulkheads as the communication medium.

Figure 4B:
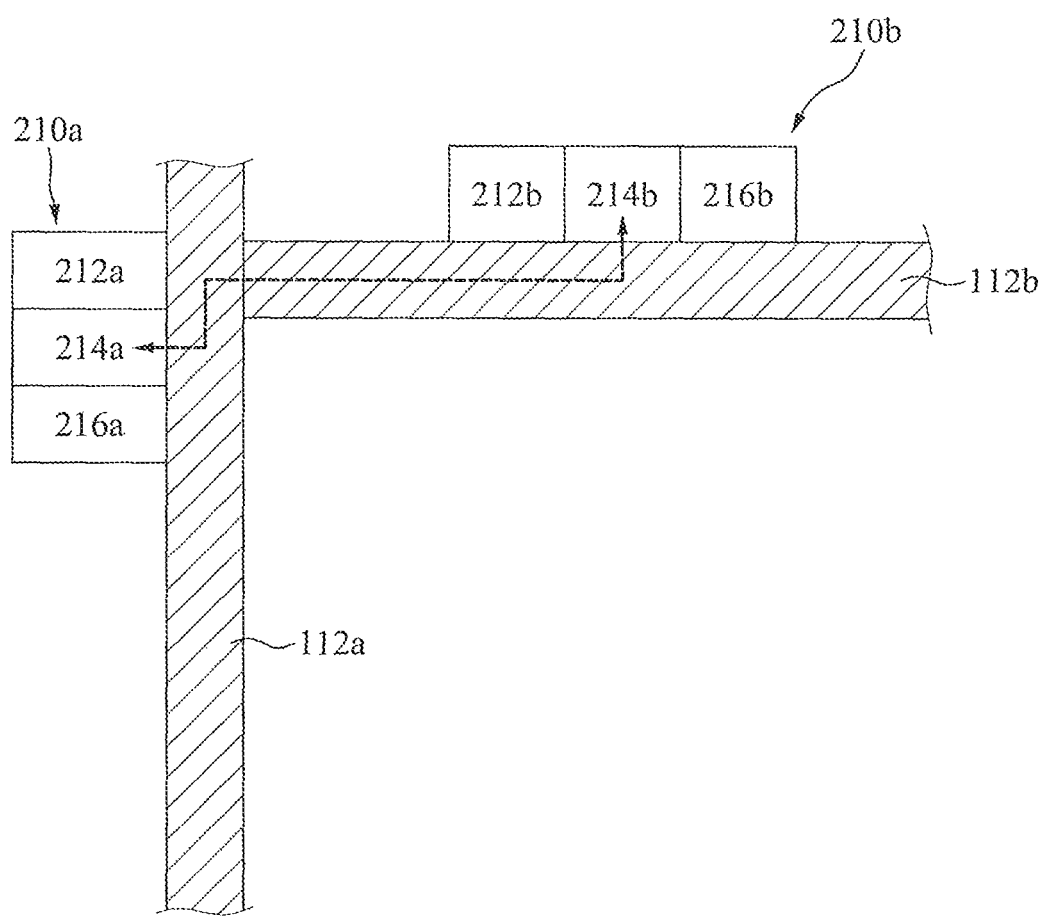

For example, referring to FIG. 4B, when a first bulkhead 112a and a second bulkhead 112b are connected to each other, the first communication device 210a is provided on a first surface of the first bulkhead 112a, and the second communication device 210b is provided on a second surface of the second bulkhead 112b, the first communication device 210a and the second communication device 210b may transmit and receive data using the first bulkhead 112a and the second bulkhead 112b as a communication medium.

Figure 4C:
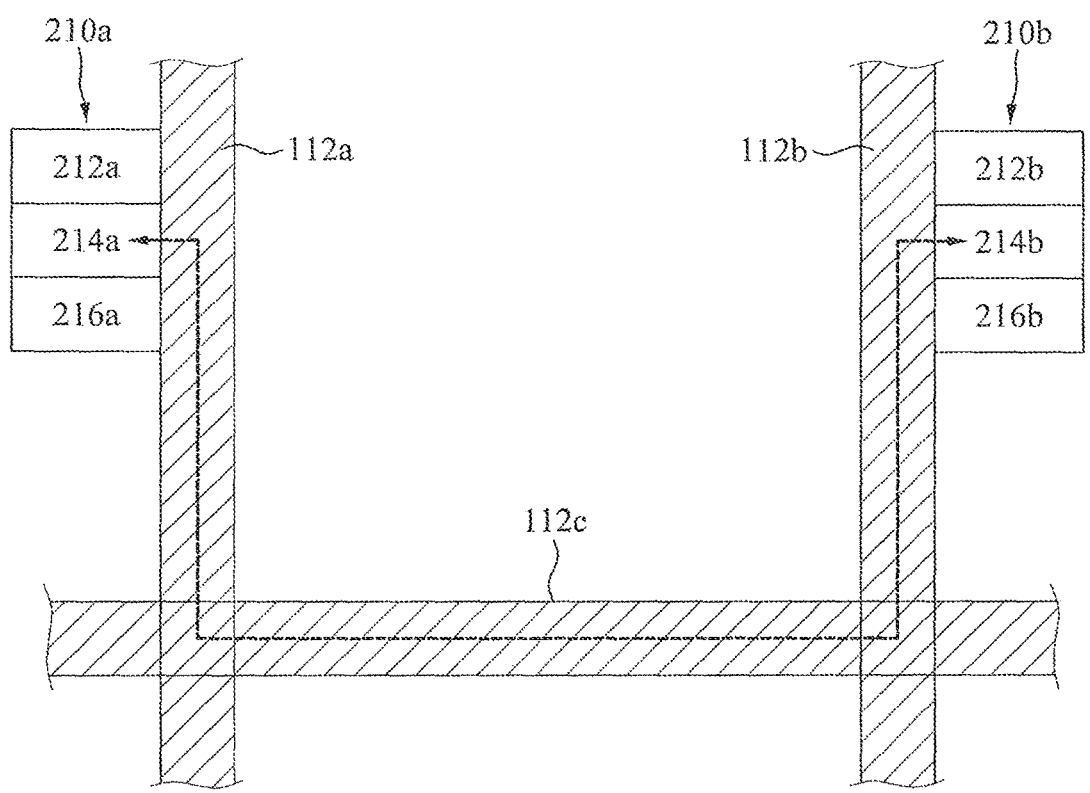

As another example, referring to FIG. 4C, when the first bulkhead 112a, the second bulkhead 112b, and a third bulkhead 112c are present, the first bulkhead 112a and the second bulkhead 112b are connected through the third bulkhead 112c, the first communication device 210a is provided on the first surface of the first bulkhead 112a, and the second communication device 210b is provided on a second surface of the third bulkhead 112c, the first communication device 210a and the second communication device 210b may transmit and receive data using the first bulkhead 112a through the third bulkhead 112c as a communication medium.

Figure 4D:
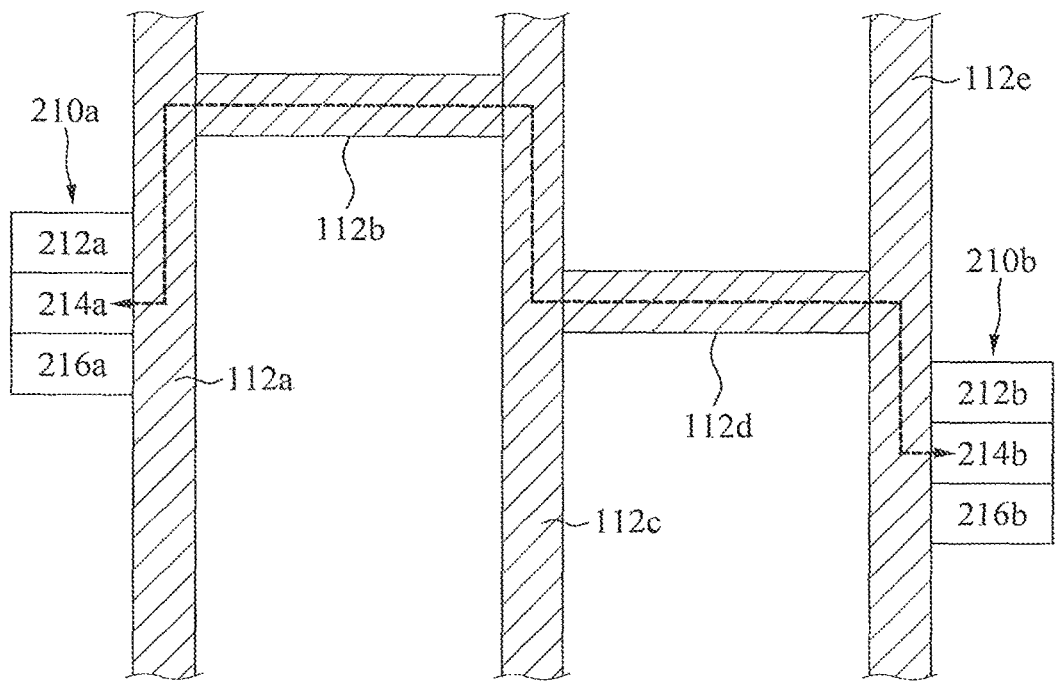

As another example, referring to FIG. 4D, when the first bulkhead 112a, the second bulkhead 112b, the third bulkhead 112c, a fourth bulkhead 112d, and a fifth bulkhead 112e are present, the first bulkhead 112a and the fifth bulkhead 112e are connected to each other through the second bulkhead 112b through the fourth bulkhead 112d, the first communication device 210a is provided on the first surface of the first bulkhead 112a, and the second communication device 210b is provided on a second surface of the fifth bulkhead 112e, the first communication device 210a and the second communication device 210b may transmit and receive data using the first bulkhead 112a through the fifth bulkhead 112e as a communication medium.

Figure 4E:
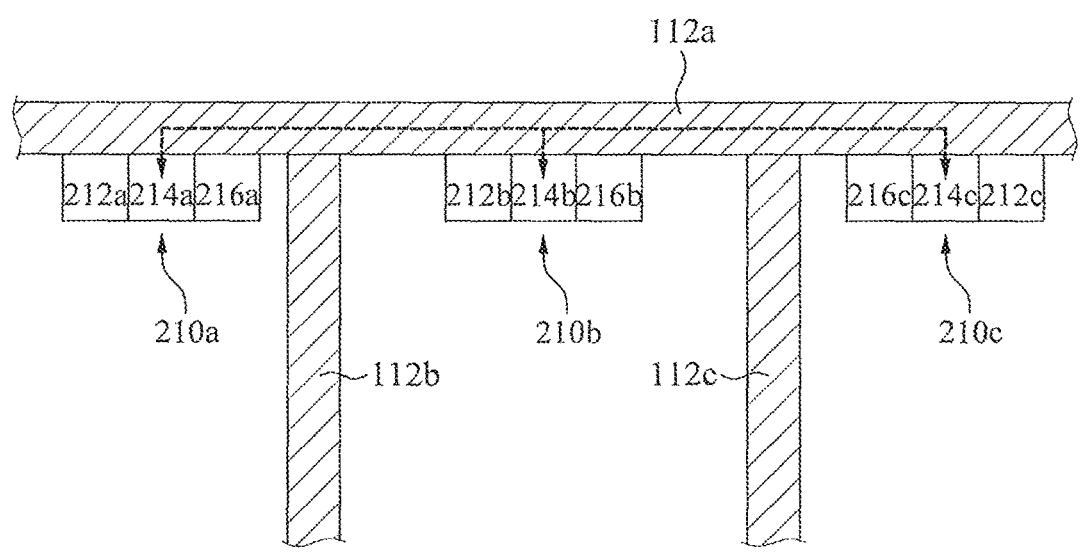

As another example, referring to FIG. 4E, although the first communication device 210a, the second communication device 210b, and a third communication device 210c are provided within separate compartments through the first bulkhead 112a, the second bulkhead 112b, and the third bulkhead 112c, the first communication device 210a through the third communication device 210c may transmit and receive data using the first bulkhead 112a as a communication medium.

According to the example embodiments, a ship network communication system may transmit and receive data in a wired and wireless manner even within a ship built with bulkheads with a thickness of 80 mm or more. Also, since the ship network communication system transmits and receives data through near field communication using a bulkhead as a communication medium, the ship network communication system may transmit and receive data at a fast speed within the ship. Also, since the ship network communication system is capable of using the bulkhead as a communication medium, installation locations of a first communication device and a second communication device may be readily set on the bulkhead. Accordingly, it is possible to enhance a degree of freedom for a system configuration.

The present disclosure is not limited to the aforementioned example embodiments and accompanying drawings. It will be apparent to those of ordinary skill in the art that various replacements, modifications, and changes may be made without departing from the technical spirit of the disclosure.

What is claimed is:

1. A signal transmission and reception apparatus that performs communication by inducing an electromagnetic field in a conductive object and by using the object as a medium, the apparatus comprising:
   an external communication module configured to exchange data with an external communication terminal using at least one first communication scheme of a wired communication and a wireless communication; and
   a magnetic field communication module configured to induce the electromagnetic field within the object and to carry the data in the induced electromagnetic field, as a signal and thereby transmit the data;
   wherein the conductive object comprises a plurality of metal bulkheads that is physically separate from each other and in contact with each other; and
   wherein the magnetic field communication module is supplied with power and induces the electromagnetic field in the plurality of metal bulkheads and a counterpart device, and carries the data in the electromagnetic field and thereby transmits the data.

2. A signal transmission and reception apparatus that performs communication by inducing an electromagnetic field in a conductive object and by using the object as a medium, the apparatus comprising:
   an external communication module configured to exchange data with an external communication terminal using at least one first communication scheme of a wired communication and a wireless communication; and
   a magnetic field communication module configured to induce the electromagnetic field within the object and to carry the data in the induced electromagnetic field as a signal and thereby transmit the data wherein, in response to receiving a signal transmitted from a counterpart terminal from the conductive object, the magnetic field communication module modulates the data through a pulse code modulation (PCM) scheme and transmits the data to the external communication module.

3. The apparatus of claim 2, wherein the magnetic field communication module comprises a nine coils associated with a magnetic resonance scheme that are provided in a 3-by-3 matrix form.

4. The apparatus of claim 2, wherein the magnetic field communication module has a resonant frequency capable of being adjusted to be different based on a material and a thickness of the object.

5. The apparatus of claim 2, wherein the conductive object comprises a metal bulkhead, and the magnetic field communication module is supplied with power and induces the electromagnetic field in, an inside of the metal bulkhead and a counterpart device, and carries, in the electromagnetic field, the data that is provided in an electrical signal form from the external communication module and thereby transmits the data.

6. The apparatus of claim 2, wherein the external communication module comprises an Ethernet communication module, and the Ethernet communication module converts the data to an electrical signal form using one of a frequency shift keying (FSK) modulation scheme and a phase shift keying (PSK) modulation scheme, and provides the data to the magnetic field communication module.

7. A signal transmission and reception apparatus that performs communication by inducing an electromagnetic field in a conductive object and by using the object as a medium, the apparatus comprising:
   an external communication module configured to exchange data with an external communication terminal using at least one first communication scheme of a wired communication and a wireless communication; and
   a magnetic field communication module configured to induce the electromagnetic field within the object and to carry the data in the induced electromagnetic field as a signal and thereby transmit the data wherein:
   the conductive object comprises a metal bulkhead;
   the magnetic field communication module is supplied with power and induces the electromagnetic field in an inside of the metal bulkhead and a counterpart device, and carries, in the electromagnetic field, the data that is provided in an electrical signal form from the external communication module and thereby transmits the data;
   the conductive object comprises a plurality of metal bulkheads that is physically separate from each other and in contact with each other; and the magnetic field communication module is supplied with the power and induces the electromagnetic field in the plurality of metal bulkheads and the counterpart device, and carries the data in the electromagnetic field and thereby transmits the data.

8. The apparatus of claim 7, wherein the magnetic field communication module comprises a nine coils associated with a magnetic resonance scheme that are provided in a 3-by-3 matrix form.

9. The apparatus of claim 7, wherein the magnetic field communication module has a resonant frequency capable of being adjusted to be different based on a material and a thickness of the object.

10. The apparatus of claim 7, wherein the magnetic field communication module modulates the data provided from the external communication module through a phase modulation (PM) scheme and carries the data, in the induced electromagnetic field and thereby transmits the data.

11. The apparatus of claim 7, wherein the magnetic field communication module has a resonant frequency capable of being adjusted to be different based on a material and a thickness of the object.

\* \* \* \* \*